(12) United States Patent
Belvin et al.

(10) Patent No.: US 9,344,510 B2
(45) Date of Patent: May 17, 2016

(54) PUSHING CONTENT FROM A LOCAL DEVICE TO A REMOTE DISPLAY

(75) Inventors: Marcus L. Belvin, Raleigh, NC (US); Henri F. Meli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2026 days.

(21) Appl. No.: 12/497,606

(22) Filed: Jul. 3, 2009

(65) Prior Publication Data

US 2011/0001686 A1    Jan. 6, 2011

(51) Int. Cl.
| | | |
|---|---|---|
| H04N 21/40 | (2011.01) | |
| G06F 15/16 | (2006.01) | |
| H04L 29/08 | (2006.01) | |
| H04L 29/06 | (2006.01) | |
| H04N 21/41 | (2011.01) | |
| G06F 3/14 | (2006.01) | |

(52) U.S. Cl.
CPC .............. *H04L 67/26* (2013.01); *G06F 3/1454* (2013.01); *H04L 65/4084* (2013.01); *H04L 67/10* (2013.01); *H04L 67/148* (2013.01); *H04L 67/18* (2013.01); *H04N 21/4122* (2013.01); *G09G 2356/00* (2013.01); *G09G 2370/022* (2013.01); *G09G 2370/16* (2013.01)

(58) Field of Classification Search
CPC ... H04L 65/4084; H04L 67/10; H04L 67/148; H04N 21/4122
USPC .................................... 709/205, 231; 715/700
See application file for complete search history.

(56) References Cited

U.S. PATENT DOCUMENTS

| | | | |
|---|---|---|---|
| 2005/0015807 A1* | 1/2005 | Young .............................. | 725/86 |
| 2006/0020960 A1* | 1/2006 | Relan et al. ...................... | 725/30 |
| 2007/0161371 A1 | 7/2007 | Dobrowski et al. | |
| 2009/0009530 A1* | 1/2009 | Araki et al. .................... | 345/619 |
| 2009/0319348 A1* | 12/2009 | Khosravy et al. ............ | 705/14.1 |

OTHER PUBLICATIONS

"Grid Computing" http://en.wikipedia.org/wiki/Grid_computing, pp. 1-14.
"Mesh Networking", http://en.wikipedia.org/wiki/Mash_network, pp. 1-5.

\* cited by examiner

*Primary Examiner* — Aaron Strange
(74) *Attorney, Agent, or Firm* — Law Office of Jim Boice

(57) ABSTRACT

One or more remote content-displaying devices are represented on a display of a content-pushing device. A user of the content-pushing device is thus enabled to select which remote content-displaying device(s) is to receive and display the content.

16 Claims, 5 Drawing Sheets

PUSHING CONTENT FROM A LOCAL DEVICE TO A REMOTE DISPLAY

BACKGROUND

The present disclosure relates to the field of electronic devices, and specifically to content that is presented on displays of electronic devices. Still more particularly, the present disclosure relates to presenting content on remote displays.

Content, such as pictures, video streams, graphs, text documents, etc. can be displayed on a display of an electronic device. Examples of such electronic devices include, but are not limited to, computers (including laptops and desktop systems), cell phones, personal digital assistants (PDAs), etc.

BRIEF SUMMARY

One or more remote content-displaying devices are represented on a display of a content-pushing device. A user of the content-pushing device is thus enabled to select which remote content-displaying device(s) is to receive and display the content.

DETAILED DESCRIPTION

Figure 1:
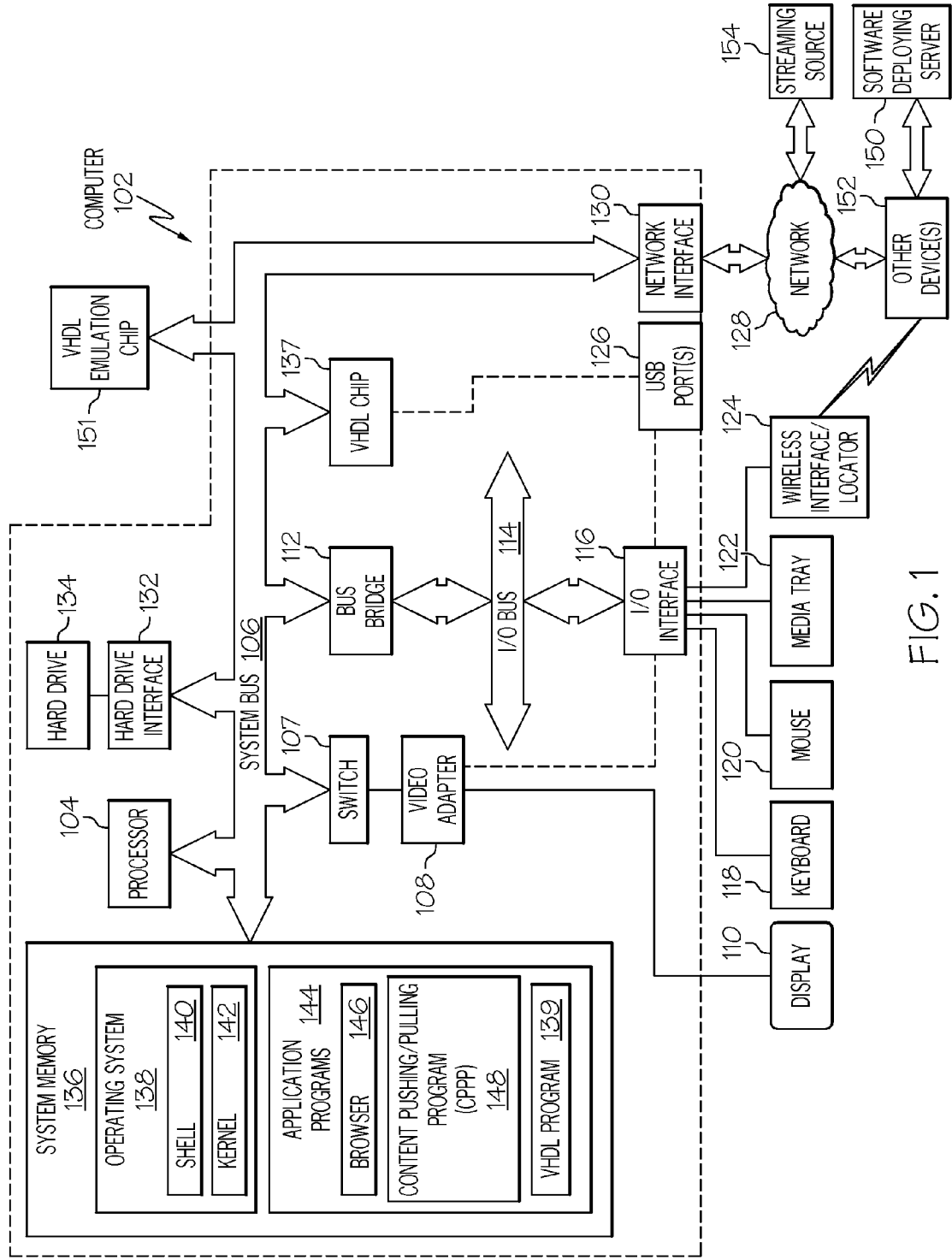
FIG. 1 depicts an exemplary hardware device in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which depicts one example of an appropriately configured hardware device that may be utilized by the present invention. Note that some or all of the exemplary architecture, including both depicted hardware and software, shown for and within computer 102 may be utilized by software deploying server 150 and/or other devices 152. Similarly, some or all of the architecture of computer 102 may be utilized by content-pushing device 202 and/or content-displaying devices 204a-n (where "n" is an integer).

Computer 102 includes a processor unit 104 that is coupled to a system bus 106. Processor unit 104 may utilize one or more processors, each of which has one or more processor cores. A video adapter 108 drives/supports a display 110, which is an output display that is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., content pushing/pulling program—CPPP 148 described below) that support the processes described herein. Note that in one embodiment, video adapter 108 is directly connected to I/O interface 116, thus permitting computer 102 (when functioning as a content-displaying device such as content-displaying device 204a shown below in FIG. 2) to directly display pushed content from a content-pushing device (e.g., content-pushing device 202 shown in FIG. 2) on display 110 without utilizing any other resources (e.g., processor 104, hard drive 134, system bus 106, system memory 136, etc.) in computer 102. That is, in one embodiment, the pushed content is never stored on hard drive 134 or otherwise manipulated by computer 102, but rather the content-pushing device commandeers the video adapter 108 and display 110 to display the pushed content.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a wireless interface/locator 124, and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

In one embodiment, wireless interface/locator 124 serves two functions. The first function is to provide a wireless interface with other device(s) 152. The second function is to optionally act as a hardware locator device for physically locating where the other device(s) 152 are physically located in three-dimensions relative to computer 102. This physical location is optimally updated in real time, such that computer 102 "knows" the direction and distance to all of the other device(s) 152 at any time, particularly after the computer 102 ("content pushing device") or any of the other device(s) 152 ("remote content-displaying devices") are physically moved/repositioned.

Note that computer 102 may be a computer such as a laptop, desktop, etc., or alternatively, computer 102 may be a "smart" phone, a personal digital assistant (PDA), or any other device that is capable of storing, displaying, and transmitting content using one or more of the processes/protocols described herein. Similarly, other device(s) 152 may also be a "smart" phone, a PDA, etc., as well as a projector that is capable of receiving and displaying pushed content as describe herein.

The pushed content utilized herein includes, but is not limited to images (e.g., drawings, photos, video streams, etc.), text documents, graphs, etc. The pushed content may be proprietary to a particular application, or alternatively, the pushed content may be rendered by specialized software. If the pushed content is proprietary, then both the content-pushing device (e.g., computer 102) and the remote content-displaying device (e.g., other device(s) 152) should have local copies of the particular application. Similarly, if the pushed content is rendered by specialized software that is agnostic as to what application originally created the pushed content, then the remote content-displaying device and, optionally, the content-pushing device, should have local copies of this specialized software. If the software deploying server 150 is functioning as a Software as a Service (SaaS) server, then software deploying server 150 should be running a copy of the particular application or the specialized software described above.

As depicted, computer 102 is able to communicate with a software deploying server 150 and content providers 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a content pushing/pulling program (CPPP) 148. CPPP 148 includes code for implementing the processes described below, including those described in FIGS. 2-4. In one embodiment, computer 102 is able to download CPPP 148 from software deploying server 150, including in an on-demand basis. Note further that, in one embodiment of the present invention, software deploying server 150 performs all of the functions associated with the present invention (including execution of CPPP 148), thus freeing computer 102 from having to use its own internal computing resources to execute CPPP 148. Furthermore, in one embodiment, software deploying server 150 can function as a Software as a Service (SaaS) server that licenses the application CPPP 148 to customers such as computer 102 for use as a service on demand.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CPPP 148 causes VHDL program 139 to configure VHDL chip 137, which may be an FPGA, ASIC, etc.

In another embodiment of the present invention, execution of instructions from CPPP 148 results in a utilization of VHDL program 139 to program a VHDL emulation chip 151. VHDL emulation chip 151 may incorporate a similar architecture as described above for VHDL chip 137. Once CPPP 148 and VHDL program 139 program VHDL emulation chip 151, VHDL emulation chip 151 performs, as hardware, some or all functions described by one or more executions of some or all of the instructions found in CPPP 148. That is, the VHDL emulation chip 151 is a hardware emulation of some or all of the software instructions found in CPPP 148. In one embodiment, VHDL emulation chip 151 is a programmable read only memory (PROM) that, once burned in accordance with instructions from CPPP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
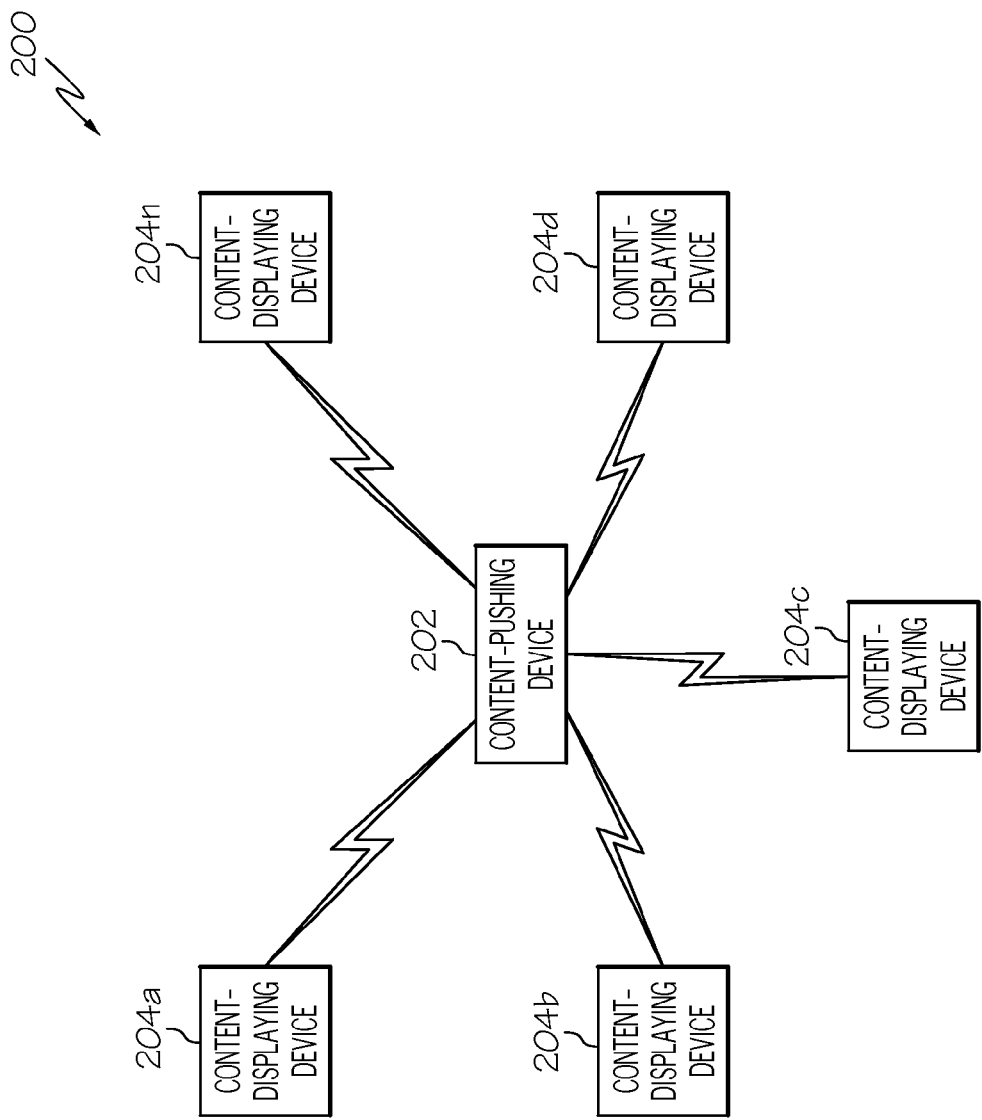
FIG. 2 illustrates a personal area network (PAN) in which hardware devices are peer-to-peer connected by short-range radio waves, as used in one embodiment of the present invention.

Referring now to FIG. 2, an exemplary personal area network (PAN) 200 as contemplated for use in one embodiment of the present disclosure is presented. PAN 200 is a peer-to-peer network, in which content-pushing device 202 and content-displaying devices 204a-n (where "n" is an integer) directly communicate. In one embodiment, this direct communication is via a short-range radio wave (non-line-of-sight) or infrared wave (line-of-sight). If using a short-range radio wave, in one embodiment the physical distance between the content-pushing device and each of the content-displaying devices 204a-n is less than 100 meters, in accordance with standard protocols for such short-range radio wave communication. As described below, content-pushing device 202 "pushes" content to one or more of the content-displaying devices 204a-n. This provides numerous advantages over the prior art, including, but not limited to, reallocating the use of a local display on content-pushing device 202 to the use of a remote display on one or more of the content-receiving devices 204a-n (thus conserving display real-estate on a display used by the content-pushing device 202); easy sharing of content between different devices (e.g., rather than sending a content as an attachment, etc. that must be processed by a receiving computer, the content can be directly "pushed" onto a display/monitor of the receiving computer for immediate viewing by another user on a computer system (receiving computer) that is different from the sending computer); allowing a sending computer to determine how much "display real estate" is taken up by the sent content by allowing a user of the sending computer, or hardware/logic within the sending computer, to size the content being sent; etc.

Note that in one embodiment, the content from the content-pushing device 202 may be directly pushed onto a display of one or more of the content-displaying devices. To permit this technique, the content-displaying devices 204a-n preferably are running a program (e.g., CPPP 148 shown in FIG. 1) that instructs an I/O interface to allow the pushed content to be sent directly to a video adapter (108) for the display (110), thus bypassing the processor, hard drive, system bus, etc. in the content-displaying devices 204a-n.

Note further that, in one embodiment, one or more of the content-displaying devices 204a-n may act as a content-pushing device while the content-pushing device 202 acts as a content-receiving device. Similarly, each of the content-displaying devices 204a-n may act as a content-pushing device to any of the other content-displaying devices 204a-n.

Note also the content-pushing device 202 and each of the content-displaying devices 204a-n are separate and distinct devices, each of which has its own hardware, processing logic, memory, etc. Thus, pushing content from content-pushing device 202 actually pushes the content to another remote device, and does not merely push the content to another display on the content-pushing device 202.

Figure 3A:
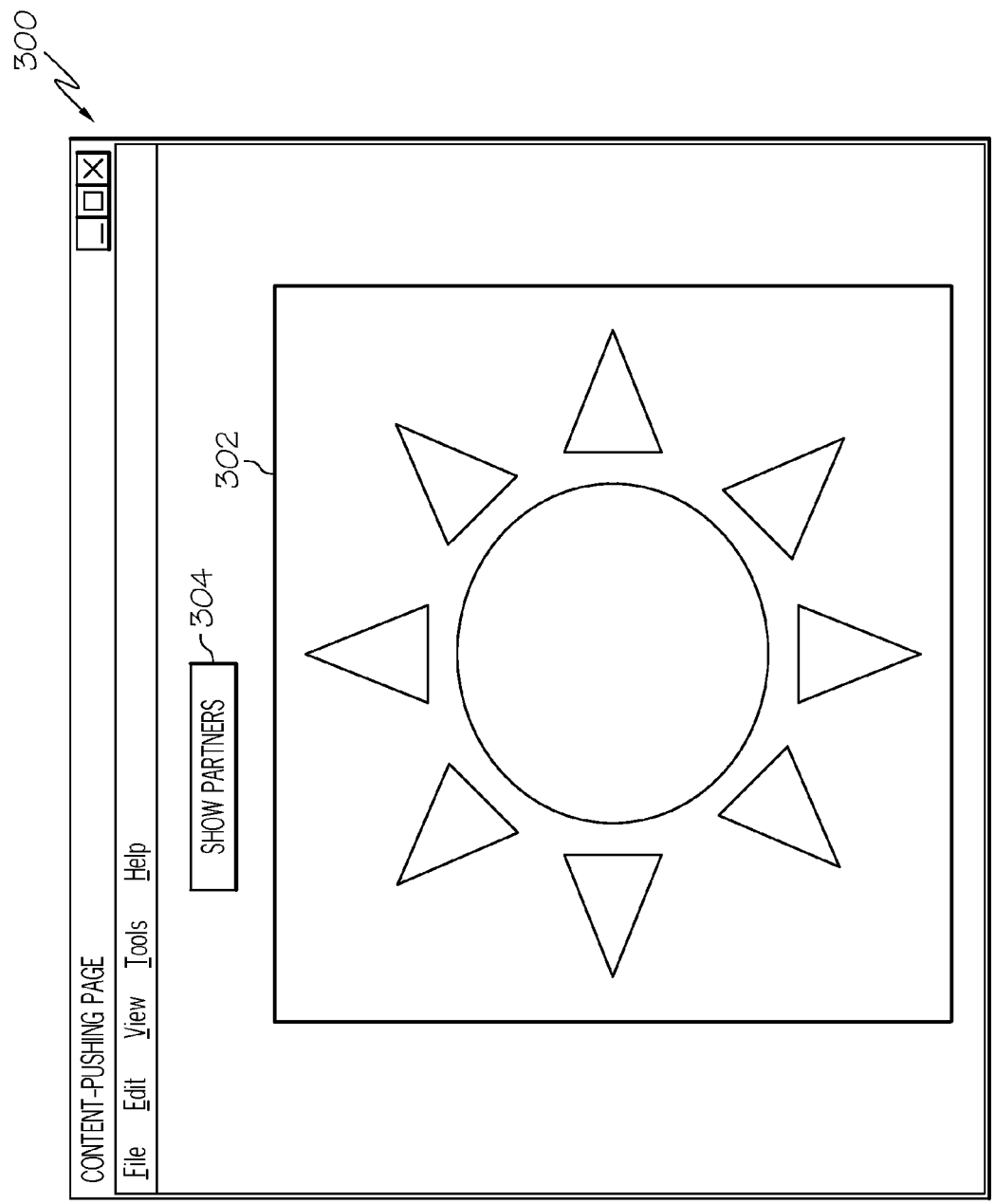
FIG. 3A depicts an exemplary graphical user interface (GUI) displaying a content on a content-pushing device.

With reference now to FIG. 3A, a graphical user interface (GUI) 300 displayed on a display of a content-pushing device, such as content-pushing device 202 shown in FIG. 2, is presented. A content 302 is shown on GUI 300. For purposes of simplicity and clarity, content 302 is a simple picture. Alternatively, however, content 302 may be any content (e.g., a graph, a text document, a video stream from another source, etc.) that is to be pushed onto a content-displaying device. In order to push content 302, a user of GUI 300 needs to know where to push it. Clicking the "Show partners" button 304 brings up the GUI 306 shown in FIG. 3B.

GUI 306 displays a representation 308, which shows the physical location of the content-displaying devices 204a-n shown in FIG. 2. Note that GUI 306 and representation 308 show the real-time physical location and orientation of all of the content-displaying devices 204a-n (remote devices) relative to content-pushing device 202 (a local device). This orientation is determined and calculated by a wireless interface/locator 124 shown in FIG. 1. Wireless interface/locator 124 utilizes distance determining logic (e.g., using Doppler shifting, etc.) and direction determining logic (e.g., using a multidirectional array of transceivers) to derive the exact three-dimension orientation of the content-displaying devices 204a-n relative to the content-pushing device 202. Thus, by simply comparing the representation 308 to what is actually seen in his environment, a user can know which content-displaying device 204a-n is which. Assume that the user of content-pushing device 202 sees a friend sitting at his laptop off to his left and slightly in front of himself, which is represented on representation 308 as content-displaying device 204a. In one embodiment, the user does not need to know if his friend is registered to use the content-displaying device 204a, only that his friend is sitting in front of it. By clicking the icon for content-displaying device 204a (now visually coded with a bold outline), the user can push the content 302 from FIG. 3A to his friend at content-displaying device 204a by clicking the "Push content" button 310. The content is then pushed from content-pushing device 202 to content-displaying device 204a.

Figure 4:
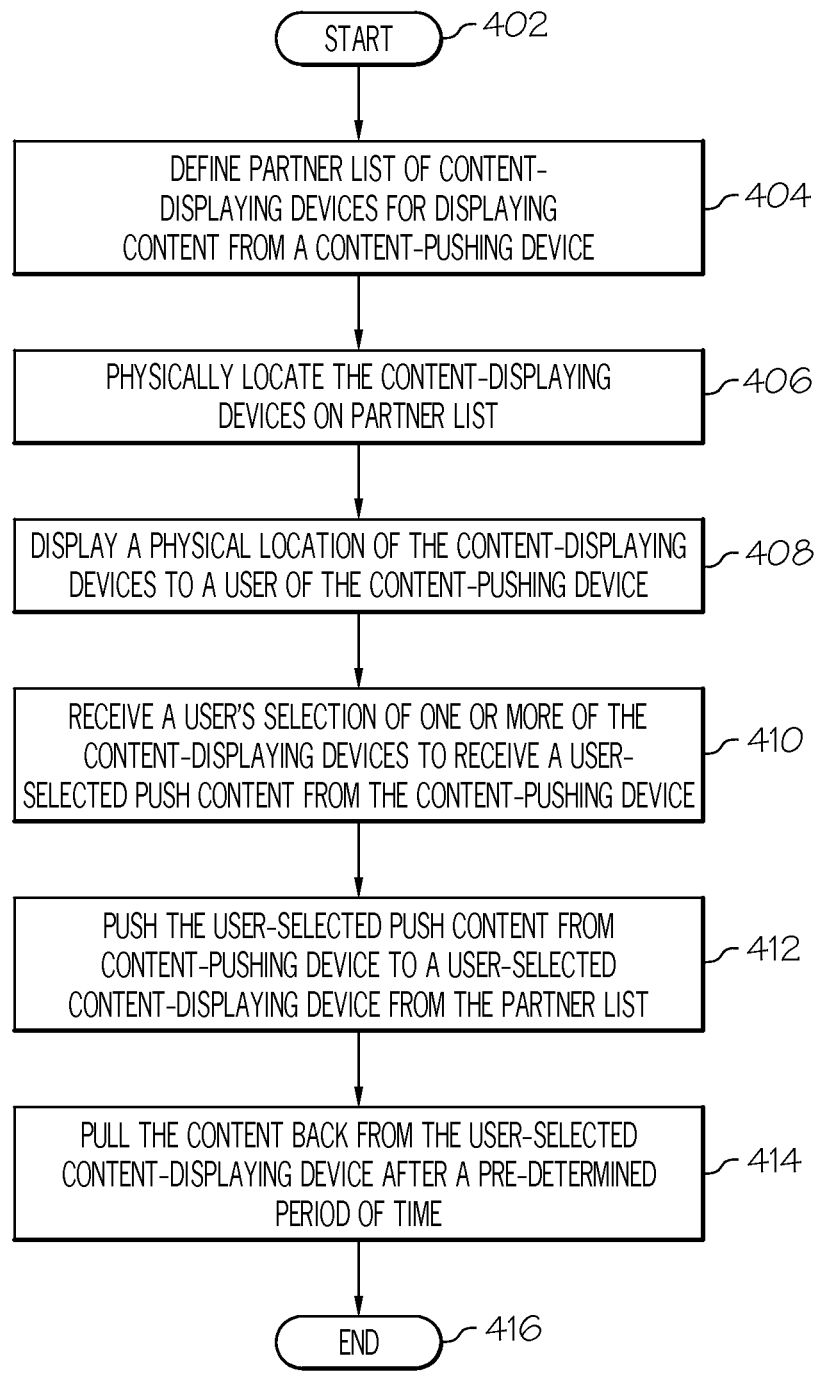
FIG. 4 is a high-level flow-chart that includes exemplary steps taken to push content from one device to another, wherein one or more of the steps are executed by an appropriately configured hardware device.

With reference now to FIG. 4, a high level flow-chart of exemplary steps taken to push content from a content-pushing device to one or more content-displaying devices is presented. After initiator block 402, which may be prompted by a user of a content-pushing device deciding to push content onto another device, a partner list is defined (block 404). This partner list shows all content displaying devices that are able to display content that is pushed from the content-pushing device. In one embodiment, all devices listed on the partner list either are loaded with software that permits their display system to be commandeered by the pushed content, or the devices are hardware-configured to permit pushed content to flow directly into their video adapter and display. Thus, in one embodiment the pushed content is created in the content-pushing device by a first application, and the pushed content is displayed at the remote content-displaying device by a second application. In another embodiment, the content is created in the content-pushing device and is displayed at the remote content-displaying device using a same application.

As depicted in block 406, the devices on the partner list (representing one or more remote content-displaying devices) are located. In one embodiment, this locating process comprises actually determining a physical location of the content-displaying devices, such as the proximate three-dimensional locations described above in FIGS. 3A-B. In another embodiment, the locations of the content-displaying devices (e.g., other device(s) 152 shown in FIG. 1) are nodes on a network (e.g., network 128 shown in FIG. 1) to which the content-pushing device (e.g., computer 102 shown in FIG. 1) is coupled.

Figure 3B:
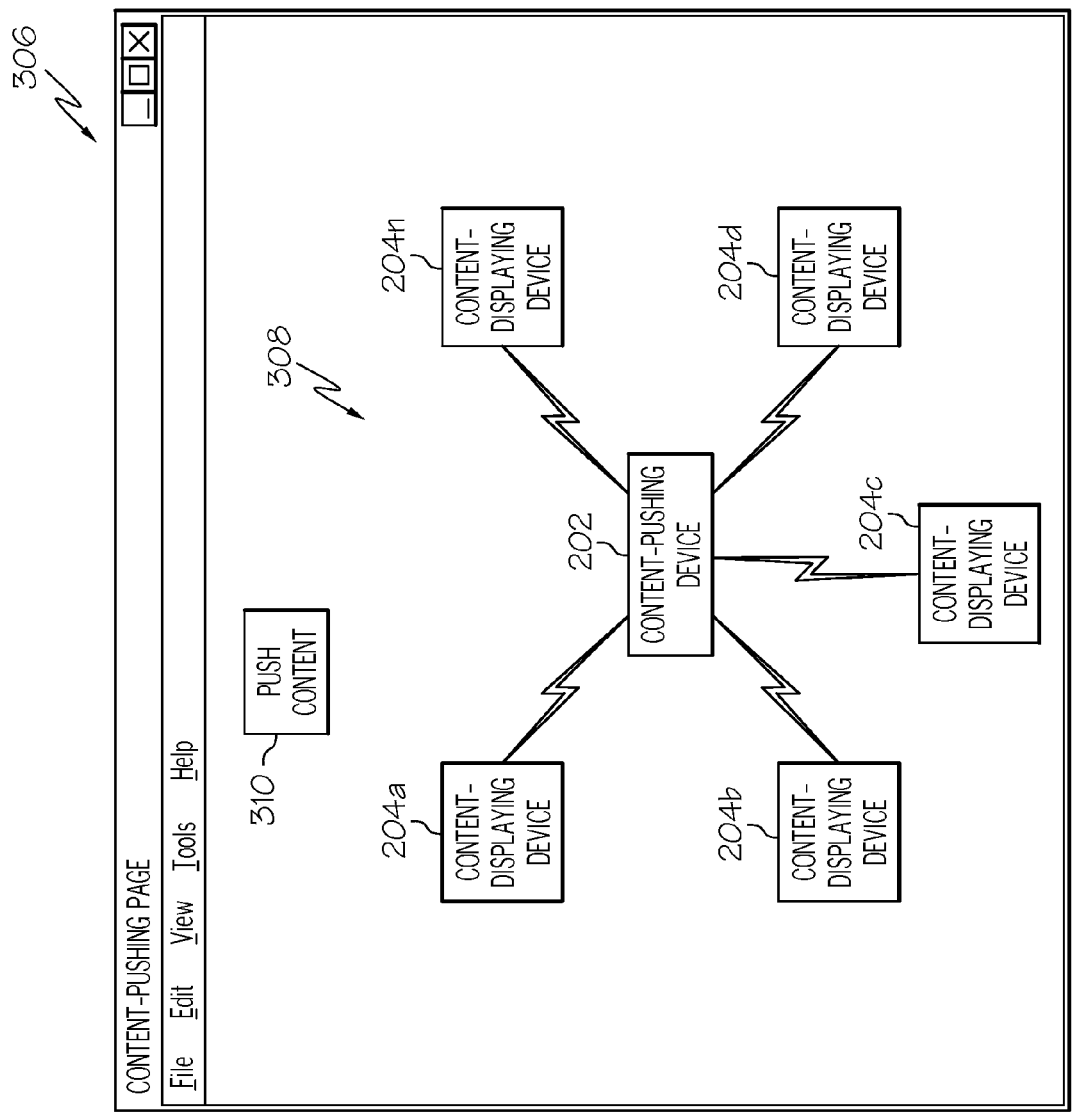
FIG. 3B depicts another GUI displaying a real-time three-dimensional representation of locations of potential remote content-displaying devices.

As described in block 408, the locations (physical locations in one or more embodiments) of the content-displaying devices are displayed to a user of the content-pushing device, as described in an exemplary embodiment above in FIG. 3B. In one embodiment, these displayed locations are in real time. Thus, whenever the content-pushing device and/or one or more of the content-displaying devices are physically repositioned/moved, the display is updated in real time.

As described in block 410, and as shown in one example above in FIG. 3B, a user's selection of which of multiple content-displaying devices is to receive the pushed content is received by pushing logic (e.g., wireless interface/locator 124, network interface 130, and/or processor 104 shown in FIG. 1) in the content-pushing device, which then pushes the content to the user-selected remote content-displaying device (block 412). Optionally, the pushed content can be "pulled" back from the remote content-displaying device by the content-pushing device after a pre-determined period of time (block 414). The process ends at terminator block 416.

Note again that the content being pushed may be a non-editable graphic representation (e.g., a write-protected text document, a protected picture, graph, etc.), or it may be an editable content, thus allowing users of the content-pushing device and the content-displaying device to dialog and make changes to the content back and forth (assuming that the roles of the content-pushing device and the content-displaying device are able to switch back and forth, as described above).

Note also that in one embodiment, the content is a streaming content that passes from a third party (e.g., a streaming source 154 shown in FIG. 1) through the content-pushing device (e.g., computer 102 shown in FIG. 1) to the content-displaying device (e.g., other devices 152 shown in FIG. 1).

As described above, the content-displaying device may display the pushed content on a monitor, or the content-displaying device may be a networked projector that is capable of projecting the pushed content onto a screen.

In one embodiment, the pushed content can be automatically sized by the content-pushing device to cause the pushed content to occupy only part of a display on the remote content-displaying device. Thus, if the content-pushing device knows that the remote content-displaying device is a computer with a large monitor or is a projector, the content-pushing device can size the pushed content to only take up a very small percentage of the real estate on the monitor or projection screen. Alternatively, if the content-pushing device knows that the remote content-displaying device is a PDA or other device with a small display, then the pushed content can be sized by the content-pushing device to take up a large portion of the remote content-displaying device's display, in order to ensure that the content can be read/viewed.

As noted above, in one embodiment the content-pushing device is actually an on-demand service provider that utilizes a SaaS server such as software deploying server 150 shown in FIG. 1. Thus, this SaaS server determines who should see the content. In one embodiment, this determination is based on criteria set by a content manager, such as a moderator of a meeting, a department manager, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of pushing content from a content-pushing device to a remote content-displaying device, the method comprising:
    defining, at a content pushing device, a partner list of at least one remote content-displaying device for receiving content from a content-pushing device, wherein the content pushing device is an appropriately configured hardware device;
    locating, by the content pushing device, said at least one remote content-displaying device;
    displaying a location of said at least one remote content-displaying device on a display utilized by the content-pushing device, wherein the location of said at least one remote content-displaying device is a three-dimensional physical location of said at least one remote content-displaying device relative to the content-pushing device, wherein the three-dimensional physical location of said at least one remote content-displaying device is displayed on the content-pushing device, and wherein the three-dimensional physical location of said at least one remote content-displaying device relative to the content-pushing device is updated in real-time in response to the content-pushing device being physically moved;
    receiving a user's selection of at least one remote content-displaying device, from the partner list, to receive the content from the content-pushing device; and
    pushing the content from the content-pushing device to a user-selected remote content-displaying device to enable the user-selected remote content-displaying device to display the content, wherein the user-selected remote content-displaying device is determined by the user's selection.

2. The method of claim 1, wherein the content-pushing device and said at least one remote content-displaying device are proximate to each other within range of a short-range radio communication signal.

3. The method of claim 1, wherein the location of said at least one remote content-displaying device relative to said content-pushing device is determined by a wireless interface/locator within the content-pushing device, wherein the wireless interface/locator determines, in real time, a direction and a distance between said context-pushing device and multiple remote content-displaying devices.

4. The method of claim 1, wherein the content is directly pushed onto a display at said at least one receiving device while bypassing a central processor within said at least one receiving device.

5. The method of claim 1, further comprising:
    displaying a three-dimensional orientation of all content-displaying devices relative to the content-pushing device; and
    transmitting the content from the content-pushing device to a particular content-displaying device that is in use by a trusted user, wherein the trusted user has not registered to use the particular content-displaying device, and wherein the trusted user has been visually identified by a user of the content-pushing device.

6. The method of claim 1, wherein the content is a video stream from a remote streaming server, wherein the video stream passes through the content-pushing device to said at least one remote content-displaying device.

7. The method of claim 1, wherein said at least one remote content-displaying device is a video projector.

8. The method of claim 1, wherein the content is created in the content-pushing device and is displayed at the remote content-displaying device using a same application.

9. The method of claim 1, wherein the content is created in the content-pushing device by a first application, and wherein the content is displayed at the remote content-displaying device by a different second application.

10. The method of claim 1, wherein the location of said at least one remote content-displaying device is a location of a node on a network to which the content-pushing device is coupled.

11. The method of claim 1, wherein the content is editable by the remote content-displaying device.

12. The method of claim 1, wherein the content is pulled back by the content-pushing device after a pre-determined period of time.

13. The method of claim 1, wherein the content-pushing device is an on-demand service provider that utilizes a Software as a Service (SaaS) server.

14. The method of claim 1, wherein the content is automatically sized to occupy a partial portion of a display on the remote content-displaying device.

15. A method of pushing content from a content-pushing device to a remote content-displaying device, the method comprising:
    defining, at a content pushing device, a partner list of at least one remote content-displaying device for receiving content from a content-pushing device, wherein the content pushing device is an appropriately configured hardware device;
    locating, by the content pushing device, said at least one remote content-displaying device;
    displaying a location of said at least one remote content-displaying device on a display utilized by the content-pushing device;
    receiving a user's selection of at least one remote content-displaying device, from the partner list, to receive the content from the content-pushing device;
    pushing the content from the content-pushing device to a user-selected remote content-displaying device to enable the user-selected remote content-displaying device to display the content, wherein the user-selected remote content-displaying device is determined by the user's selection;

displaying a three-dimensional orientation of all content-displaying devices relative to the content-pushing device; and transmitting the content from the content-pushing device to a particular content-displaying device that is in use by a trusted user, wherein the trusted user has not registered to use the particular content-displaying device, and wherein the trusted user has been visually identified by a user of the content-pushing device.

16. A method of pushing content from a content-pushing device to a remote content-displaying device, the method comprising:

defining, at a content pushing device, a partner list of at least one remote content-displaying device for receiving content from a content-pushing device, wherein the content pushing device is an appropriately configured hardware device;

locating, by the content pushing device, said at least one remote content-displaying device;

displaying a location of said at least one remote content-displaying device on a display utilized by the content-pushing device;

receiving a user's selection of at least one remote content-displaying device, from the partner list, to receive the content from the content-pushing device;

pushing the content from the content-pushing device to a user-selected remote content-displaying device to enable the user-selected remote content-displaying device to display the content, wherein the user-selected remote content-displaying device is determined by the user's selection; and pulling the content back by the content-pushing device after a pre-determined period of time.

* * * * *